UNITED STATES PATENT OFFICE.

HARRY EINSTEIN, OF PHILADELPHIA, PENNSYLVANIA, ASSIGNOR TO THE EINSTEIN MANUFACTURING COMPANY, (LIMITED,) OF SAME PLACE.

STOVE-POLISH.

SPECIFICATION forming part of Letters Patent No. 247,812, dated October 4, 1881.

Application filed June 23, 1881. (No specimens.)

*To all whom it may concern:*

Be it known that I, HARRY EINSTEIN, a citizen of the United States, residing at Philadelphia, in the county of Philadelphia and State of Pennsylvania, have invented a new and useful composition of matter to be used as a liquid stove-polish, of which the following is a specification.

My composition consists of the following ingredients: water, thirty-five gallons; gelatine, one ounce; pulverized nut-galls, one and one-quarter pound; sulphate of iron, (copperas,) one and one-quarter pound. (The gelatine is used to set the composition, whereby it prevents evaporation, and consequently the arising of dust and odor therefrom. I have found in practice that the proportion above named is ample for the purpose.) The water is heated to the boiling-point, and the other ingredients added in the order named, and thoroughly stirred, and allowed to cool. This composition is then in proper condition to be put into bottles. Preparatory to the filling operation I place in each one-half-pint bottle two ounces of plumbago, (preferably the pure German.) I then add a sufficient quantity of the liquid to fill the bottle. The bottles are then well shaken to thoroughly mix the composition, after which it is ready for use. It is free from dust, odor, and evaporation.

I do not confine myself to the above-named proportions, as other proportions will answer.

What I claim, and desire to secure by Letters Patent of the United States, is—

The herein-described composition of matter, to be used as a liquid stove-polish, consisting of water, gelatine, nut-galls, sulphate of iron, and plumbago, substantially as described.

HARRY EINSTEIN.

Witnesses:
    THOMAS J. BEWLEY,
    STEPHEN USTICK.